United States Patent
Yogo et al.

(10) Patent No.: US 10,639,693 B2
(45) Date of Patent: May 5, 2020

(54) BENDING DEVICE

(71) Applicant: OPTON CO., LTD., Seto-shi, Aichi (JP)

(72) Inventors: Teruaki Yogo, Seto (JP); Hiroyuki Oya, Seto (JP)

(73) Assignee: OPTON CO., LTD., Seto-Shi, Aichi (JP)

( * ) Notice: Subject to any disclaimer, the term of this patent is extended or adjusted under 35 U.S.C. 154(b) by 0 days.

(21) Appl. No.: 15/566,668

(22) PCT Filed: Apr. 13, 2016

(86) PCT No.: PCT/JP2016/061951
§ 371 (c)(1),
(2) Date: Oct. 13, 2017

(87) PCT Pub. No.: WO2016/167301
PCT Pub. Date: Oct. 20, 2016

(65) Prior Publication Data
US 2018/0141097 A1 May 24, 2018

(30) Foreign Application Priority Data

Apr. 15, 2015 (JP) ................................ 2015-083711

(51) Int. Cl.
*B21D 7/02* (2006.01)
*B21D 43/00* (2006.01)
(Continued)

(52) U.S. Cl.
CPC ........... *B21D 7/024* (2013.01); *B21D 43/006* (2013.01); *B25J 5/02* (2013.01); *B25J 9/0084* (2013.01);
(Continued)

(58) Field of Classification Search
CPC ........ B21D 7/024; B21D 7/00; B21D 43/006; B25J 9/006; B25J 9/06; B25J 9/0087;
(Continued)

(56) References Cited

U.S. PATENT DOCUMENTS

2015/0352619 A1 12/2015 Yogo et al.

FOREIGN PATENT DOCUMENTS

DE 3620151 A1 2/1987
EP 0934783 A2 8/1999
(Continued)

OTHER PUBLICATIONS

International Search Report for International Patent Application No. PCT/JP2016/061951 (Form PCT/ISA/210), dated Jul. 19, 2016 (4 pages including English translation).
(Continued)

*Primary Examiner* — Teresa M Ekiert
(74) *Attorney, Agent, or Firm* — Withrow & Terranova, P.L.L.C.; Vincent K. Gustafson

(57) ABSTRACT

A bending device according to one aspect of the present invention includes a track device which linearly extends in a predetermined direction, first and second bases placed on the track device and movable on the track device, a first robot mounted on the first base, a second robot mounted on the second base, and a bending mechanism which is disposed at each end of the first and second robots and grips and bends the workpiece. The first robot is a multi-articulated robot including a joint rotatable around an axis vertical to the first base and a joint rotatable around an axis parallel to the axial direction of the workpiece. The second robot is a multi-articulated robot including a joint rotatable around an axis vertical to the second base and a joint rotatable around an axis parallel to the axial direction of the workpiece.

5 Claims, 16 Drawing Sheets

(51) Int. Cl.
  *B21J 9/00*   (2006.01)
  *B21D 7/024*  (2006.01)
  *B25J 13/00*  (2006.01)
  *B25J 5/02*   (2006.01)
  *B25J 9/00*   (2006.01)
  *B25J 9/06*   (2006.01)
  *B25J 11/00*  (2006.01)

(52) U.S. Cl.
  CPC .............. *B25J 9/0087* (2013.01); *B25J 9/06* (2013.01); *B25J 11/005* (2013.01); *B25J 13/00* (2013.01); *Y10S 901/15* (2013.01)

(58) Field of Classification Search
  CPC . B25J 9/0084; B25J 11/005; B25J 5/02; B25J 13/00
  See application file for complete search history.

(56) References Cited

FOREIGN PATENT DOCUMENTS

| | | |
|---|---|---|
| JP | H03-94921 A | 4/1991 |
| JP | 2001-212624 A | 8/2001 |
| JP | 2004-082216 A | 3/2004 |
| JP | 2006-116604 A | 5/2006 |
| JP | 2006297405 A | 11/2006 |
| JP | 2014-240091 A | 12/2014 |

OTHER PUBLICATIONS

Written Opinion for International Patent Application No. PCT/JP2016/061951 (Form PCT/ISA/237), dated Jul. 19, 2016 (9 pages including English machine translation).
Notification of Transmittal of Translation of the IPRP (Form PCT/IB/338), International Preliminary Report on Patentability (Chapter I of the Patent Cooperation Treaty) (Form PCT/IB/373) and Translation of Written Opinion of the International Search Authority (Form PCT/ISA/237) for International Patent Application No. PCT/JP2016/061951, dated Oct. 26, 2017 (8 pages, English language).
Extended European Search Report for European Patent Application No. 16780092.9 dated Oct. 29, 2018 (9 pages).
First Office Action for Taiwanese Patent Application No. 10820135220, dated Feb. 18, 2019, 15 pages.
Notice of Reasons for Refusal for Japanese Patent Application No. 2015-083711, dated May 7, 2019, 10 pages including English translation.

BENDING DEVICE

CROSS-REFERENCE TO RELATED APPLICATION

This application is a 35 U.S.C. § 371 national phase filing of International Application No. PCT/JP2016/061951 filed on Apr. 13, 2016, and claims the benefit of Japanese Patent Application No. 2015-083711 filed on Apr. 15, 2015 in the Japan Patent Office, and the entire disclosures of International Application No. PCT/JP2016/061951 and Japanese Patent Application No. 2015-083711 are hereby incorporated by reference herein in their respective entireties.

TECHNICAL FIELD

The present disclosure relates to a bending device which bends a longitudinal workpiece (such as a pipe or a bar-like material) in a predetermined direction.

BACKGROUND ART

There has been conventionally known a bending device which bends a workpiece at a plurality of positions (see, for example, Patent Document 1). In the bending device, a bending mechanism is attached to a front end of an articulated robot having three sets of joints which rotate around axes parallel to an axial direction of the workpiece. The workpiece is gripped by a chuck mechanism. The bending mechanism is moved to a predetermined position by rotation of the joints. The bending mechanism is moved in the axial direction of the workpiece by a moving mechanism.

In recent years, in order to reduce an installation space of a bending device and to improve the degree of freedom (that is, the degree of freedom of machining) when a workpiece is processed, there has been developed a bending device which uses a multi-articulated robot having a plurality of pivot joints and swing joints and in which a bending mechanism is disposed at a front end of an arm (see Patent Document 2).

PRIOR ART DOCUMENTS

Patent Documents

Patent Document 1: JP-A-2001-212624
Patent Document 2: JP-A-2006-116604

SUMMARY OF THE INVENTION

Problems to be Solved by the Invention

However, in the above bending device, although the degree of freedom of machining of the workpiece is high, there has been desired a technique for further increasing the degree of freedom of machining and improving the machining time of the workpiece (accordingly, machining speed).

One aspect of the present disclosure is to provide a bending device capable of increasing the degree of freedom of machining of a workpiece and shortening the machining time of the workpiece.

Means for Solving the Problems

The present disclosure relates to a bending device which bends a longitudinal workpiece. The bending device includes a track device which linearly extends in a predetermined direction, first and second bases which are placed on the track device and are movable on the track device, a first robot which is mounted on the first base, a second robot which is mounted on the second base, and a bending mechanism which is disposed at each end of the first and second robots and which grips and bends the workpiece.

In addition, the first robot is a multi-articulated robot including at least a joint which is rotatable around an axis vertical to the first base on which the first robot is mounted, and a joint which is rotatable around an axis parallel to an axial direction of the workpiece. Similarly, the second robot is a multi-articulated robot including at least a joint which is rotatable around an axis vertical to the second base on which the second robot is mounted, and a joint which is rotatable around an axis parallel to the axial direction of the workpiece.

That is, in the present disclosure, the first robot placed on the first base and the second robot placed on the second base are the multi-articulated robots each having the above-described joints. Accordingly, in the first robot, the first base is moved along the track device, and the joint of the multi-articulated robot is bent in a desired direction, whereby the bending mechanism can be disposed at a desired position. Similarly, in the second robot, the second base is moved along the track device, and the joint of the multi-articulated robot is bent in a desired direction, whereby the bending mechanism can be disposed at a desired position.

Thus, the workpiece gripped by the bending mechanism can be disposed at a desired position. That is, when the workpiece is conveyed and/or bent, the workpiece can be easily moved to a position where the workpiece does not interfere with the surrounding devices and/or a position suitable for conveyance (for example, a position where the conveying time is short).

Accordingly, since, for example, one end side and/or the other end side of the workpiece can be bent at the above-described preferable position, it is possible to achieve a remarkable effect that the degree of freedom of machining is high and the machining time can be shortened.

In addition, the first base and the second base can move, and, at the same time, the first robot and the second robot can be operated simultaneously. Therefore, in the course of conveying the workpiece, for example, the workpiece can be bent while being gripped by the first robot, and, at the same time, another workpiece can be bent while being gripped by the second robot. In other words, in both the first robot and the second robot, the workpieces can be respectively bent while being conveyed, and therefore, there is an effect that the machining time can be greatly shortened.

In the present disclosure, the following configuration can be adopted.

As a multi-articulated robot, for example, a multi-articulated robot with six or more axes (for example, a multi-articulated robot using three or more single-shaft pivot joints and three or more single-shaft swing joints) can be used.

A chuck device having a chuck mechanism which grips a workpiece may be provided separately from the track device. In other words, a chuck device which grips the workpiece conveyed by the first robot and/or the second robot may be provided.

In this configuration, the workpiece conveyed by the first robot and/or the second robot is gripped by the chuck device, and the workpiece can be bent in this state by using the bending mechanism of the first robot and/or the second robot. Therefore, there is an effect that the degree of freedom of machining is further improved. The workpiece conveyed by the first robot and/or the second robot may be one before bending or one after bending.

The chuck device may be placed on an auxiliary track device disposed parallel to the track device and may be configured to be movable along the auxiliary track device.

If the chuck device is not fixed at a specific position but movable on the auxiliary track device, the degree of freedom of the position where the workpiece is chucked is high, so that there is an effect that the degree of freedom of machining is improved.

In the chuck device, the vertical position may be able to be automatically or manually changed. When an arm which can rotate to the tip side is attached to a support, and a chuck mechanism is provided at a front end of the arm, the arm may be rotatable by a predetermined angle with respect to the support.

A workpiece feeder which feeds the workpiece may be disposed in a range where the bending mechanism of the first robot and/or the second robot on the track device can reach.

The track device may be constituted of a first track device and a second track device disposed separately from and parallel to the first track device. In this case, the first base and the first robot are mounted on the first track device, and the second base and the second robot are mounted on the second track device.

The first track device and the second track device may be arranged on the same straight line. Alternatively, the first track device and the second track device may be arranged in parallel on different straight lines.

A controller which controls the operation of the first base, the second base, the first robot, the second robot, the chuck device, and the bending mechanism may be provided.

One end side of the workpiece may be gripped by the bending mechanism of the first robot, and, at the same time, the other end side of the workpiece may be bent by the bending mechanism of the second robot.

In the course of conveying the workpiece while one end side of the workpiece is gripped by the bending mechanism of the first robot, the workpiece may be bent by the bending mechanism of the first robot.

When the first robot conveys the workpiece, in the course of conveying a workpiece different from the workpiece conveyed by the first robot while one end side of the different workpiece is gripped by the bending mechanism of the second robot, the different workpiece may be bent by the bending mechanism of the second robot.

BRIEF DESCRIPTION OF THE DRAWINGS

FIGS. 9A to 9C show a chuck mechanism, in which FIG. 9A is a side view showing a bending mechanism, FIG. 9B is a plan view showing the bending mechanism, and FIG. 9C is an explanatory view showing bending operation of the bending mechanism.

FIGS. 11A and 11B schematically show operation of the bending device, in which FIG. 11A is an explanatory view showing the operation in the case of using both robots, and FIG. 11B is an explanatory view showing the operation in the case of using both robots and the chuck device.

FIG. 16 shows another embodiment, in which

EXPLANATION OF REFERENCE NUMERALS

Figure 1:
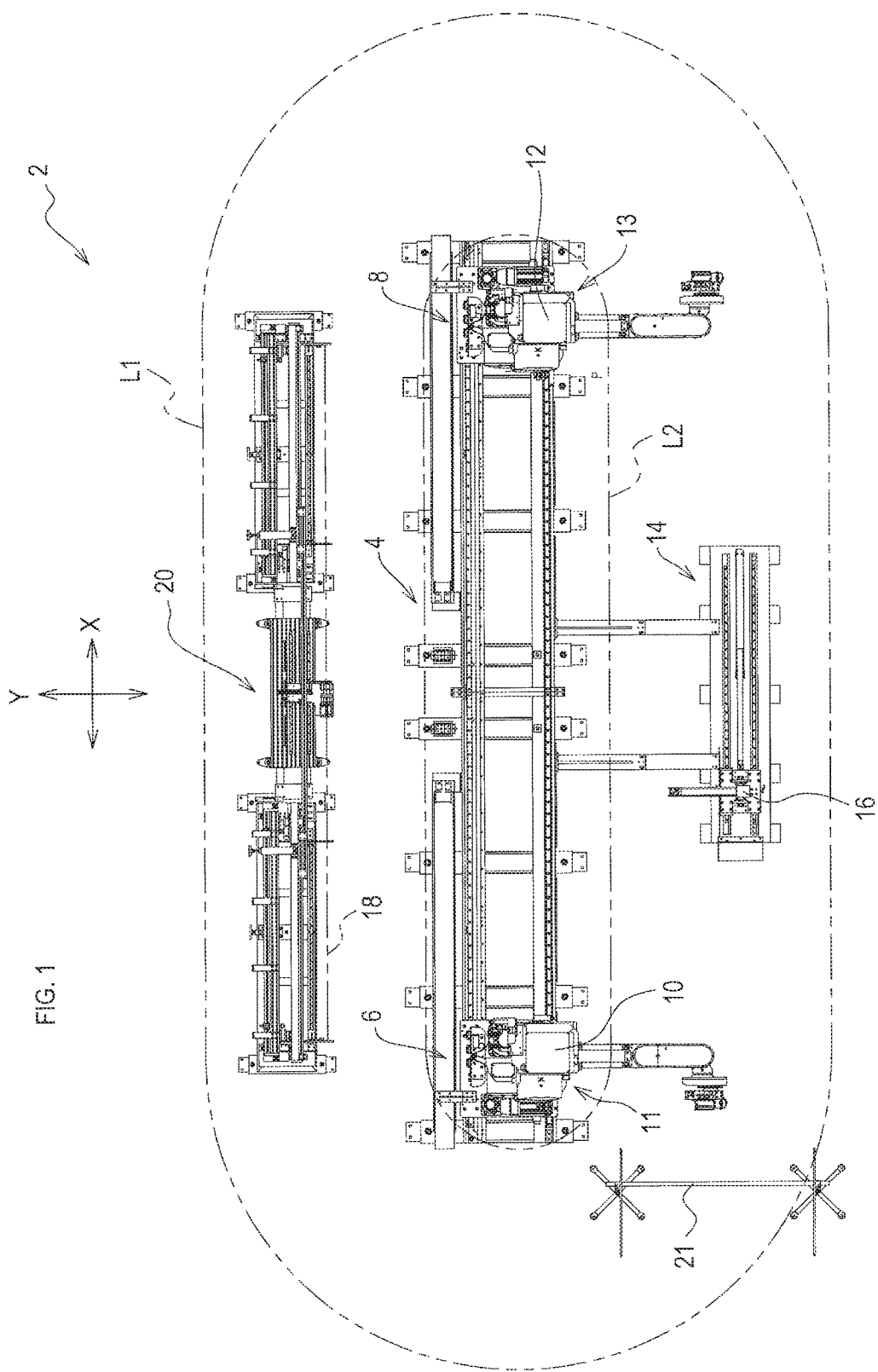
FIG. 1 is a plan view showing the overall configuration of a bending device.

2, 150, 170 Bending device
4, 152, 172 Track device
6, 158, 178 First base
8, 164, 184 Second base
10, 160, 180 First robot
11, 162, 182 First robot device
12, 166, 186 Second robot
13, 168, 188 Second robot device
16 Chuck device
20 Workpiece feeder
50, 50a, 50b Bending mechanism
80 Bending die
88 Clamping die
108 Chuck mechanism

MODE FOR CARRYING OUT THE INVENTION

Hereinafter, embodiments to which the present disclosure is applied will be described with reference to the drawings.
[Embodiment 1]

First, the overall configuration of a bending device of a first embodiment will be described.

As shown in FIGS. 1 to 5, a bending device 2 of the first embodiment includes a track device 4 which linearly extends in the horizontal direction (that is, the X direction) of FIG. 1, a first base 6 which is mounted on the track device 4 and is movable in the longitudinal direction (that is, the X direction) of the track device 4, a second base 8 which is mounted on the track device 4 and is movable in the longitudinal direction (that is, the X direction) of the track device 4, a first robot 10 mounted on the first base 6, and a second robot 12 mounted on the second base 8.

The first base 6 and the first robot 10 are referred to as a first robot device 11, and the second base 8 and the second robot 12 are referred to as a second robot device 13.

The bending device 2 further includes an auxiliary track device 14 disposed parallel to the track device 4 in a transverse direction (that is, the Y direction) perpendicular to the longitudinal direction of the track device 4, a chuck device 16 which is mounted on the auxiliary track device 14 and is movable in the X direction on the auxiliary track device 14, a conveying device (for example, a workpiece feeder: loader) 20 for a workpiece 18 disposed within the operation range of the first robot device 11 and/or the second robot device 13, and a conveyance receptacle 21 for the workpiece 18 disposed within the operation range of the first robot device 11 and/or the second robot device 13 (for example, on the left side of FIG. 1).

Figure 2:
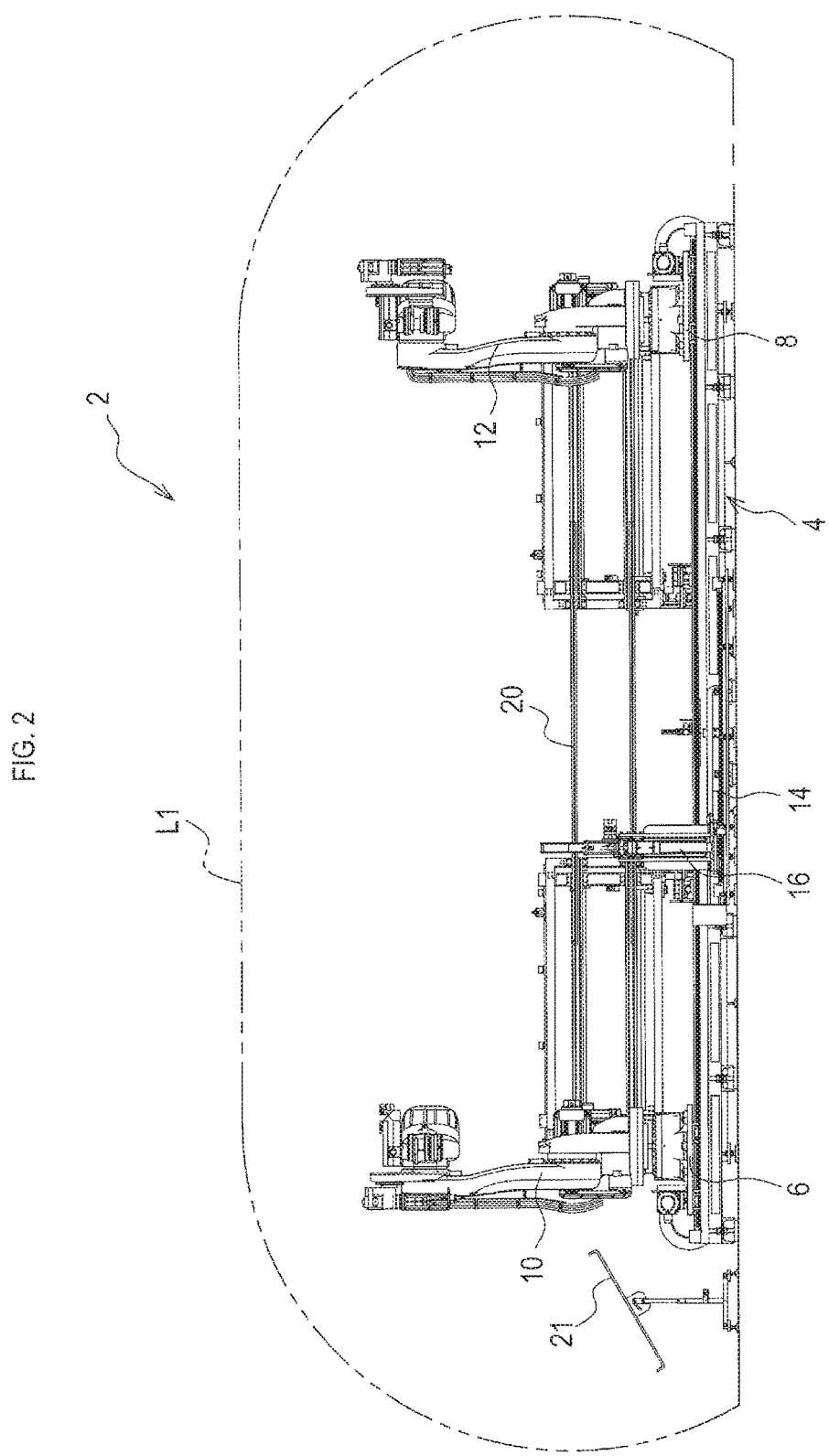
FIG. 2 is a front view showing the overall configuration of the bending device.
Figure 3:
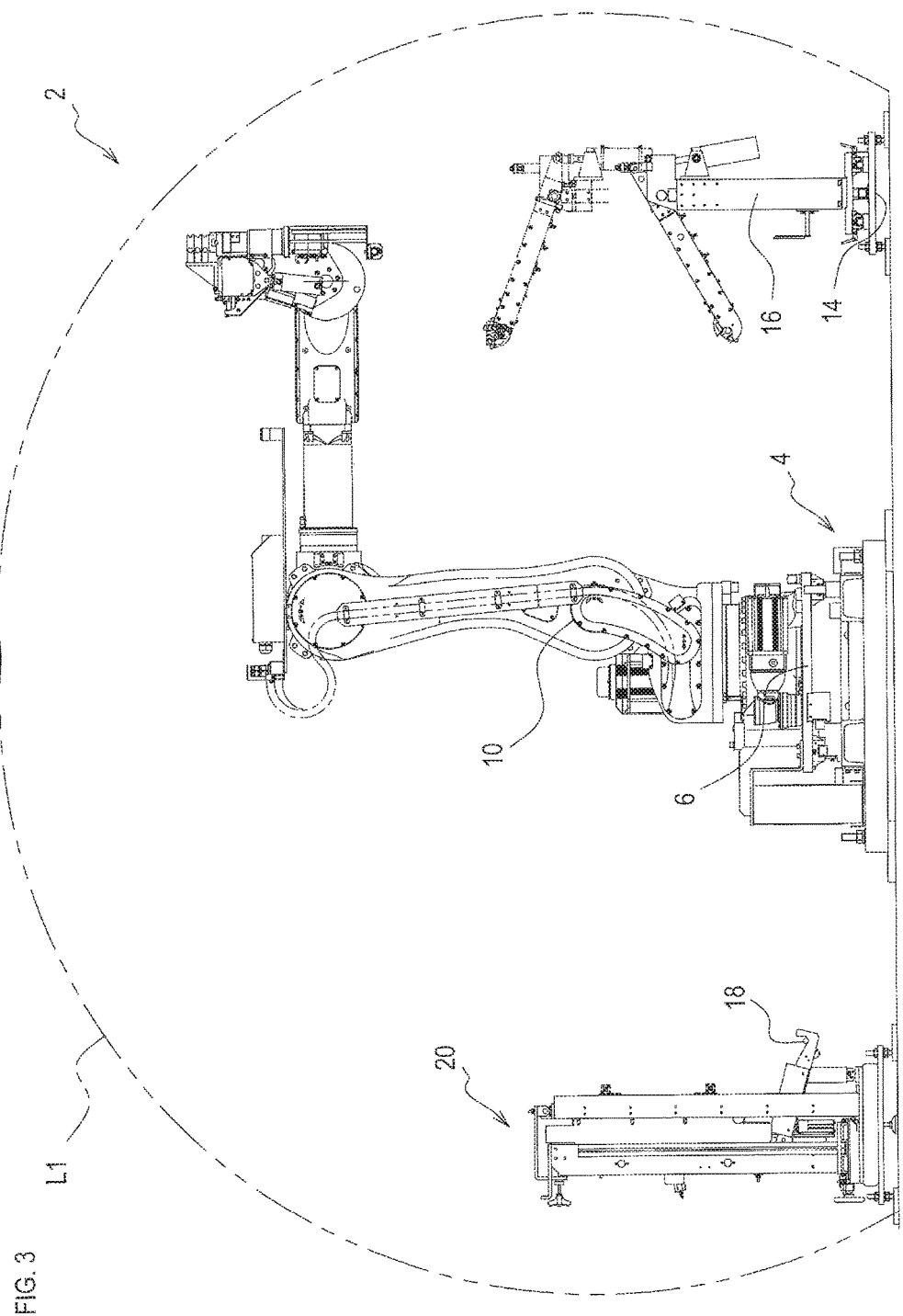
FIG. 3 is a side view showing the overall configuration of the bending device.
Figure 4:
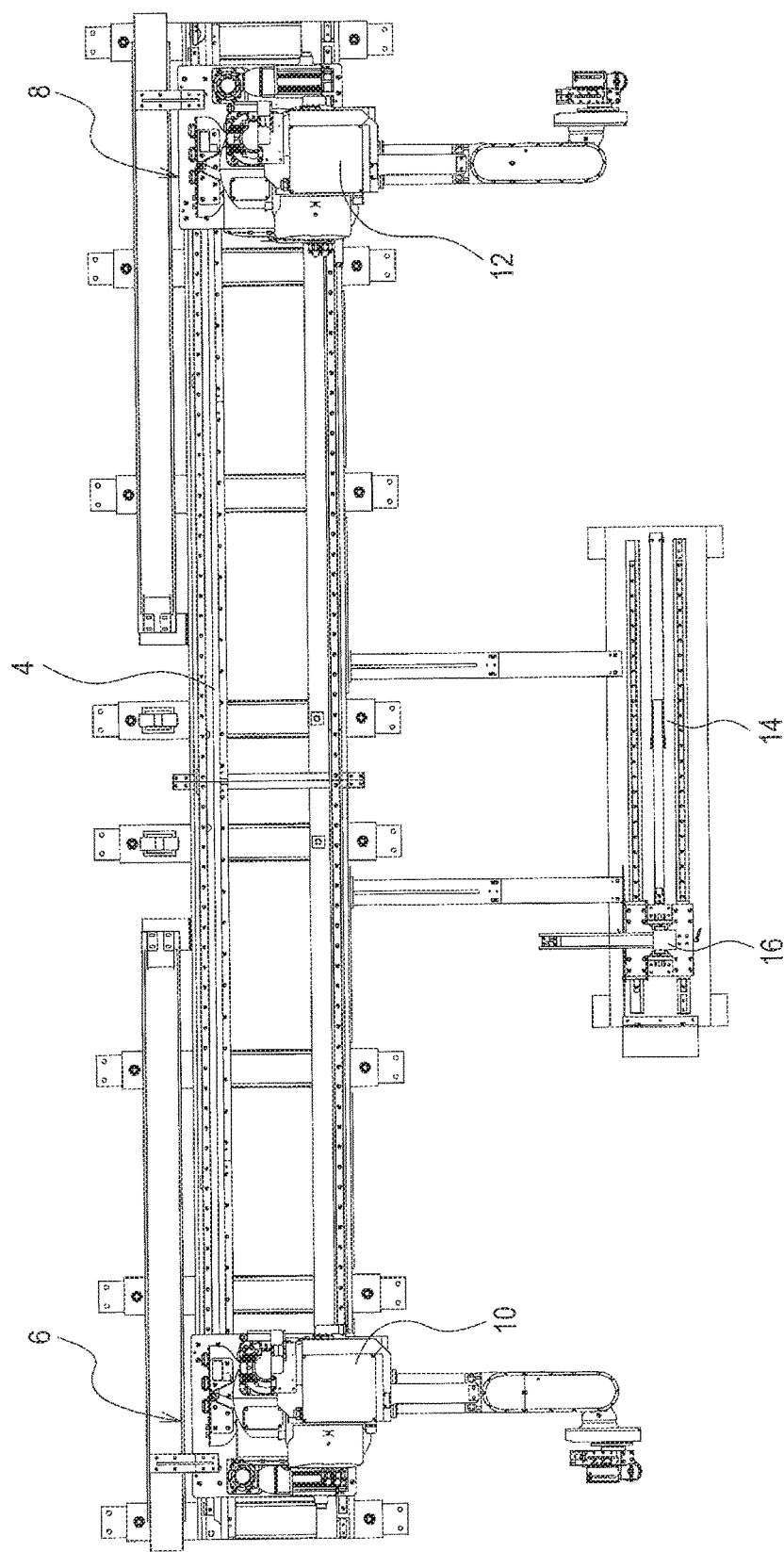
FIG. 4 is an enlarged plan view of a track device, each robot device, and a chuck device of the bending device.
Figure 5:
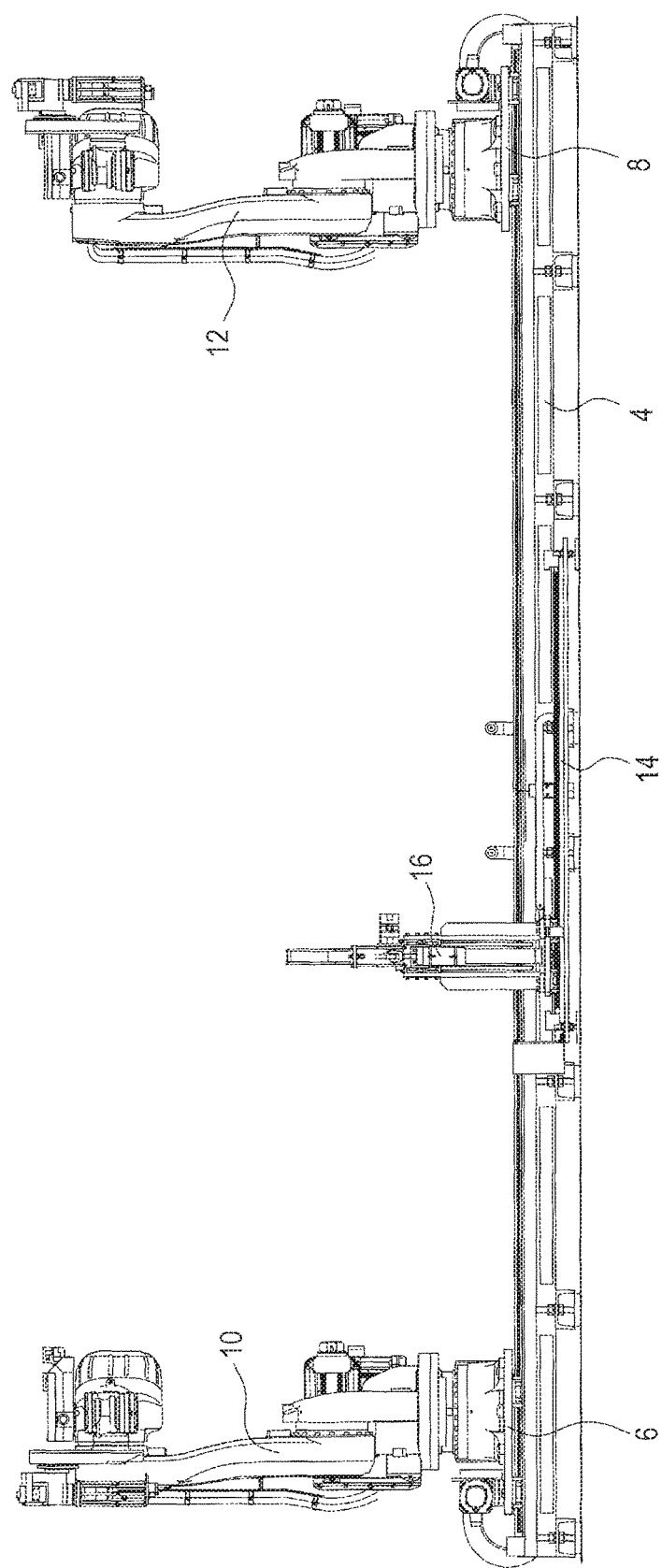
FIG. 5 is an enlarged front view of the track device, each robot device, and the chuck device of the bending device.

A range surrounded by the two-dot chain lines L1 and L2 of FIGS. 1 to 3 is the operation range of the first robot 10 and the second robot 12 (specifically, the operation range at a position where the workpiece 18 is gripped).

Next, the configuration of each part of the bending device 2 will be described in detail.

Since the first robot device 11 and the second robot device 13 basically have the same configuration, the following description will be given by taking the first robot device 11 as an example.

<Track Device 4>

Figure 6:
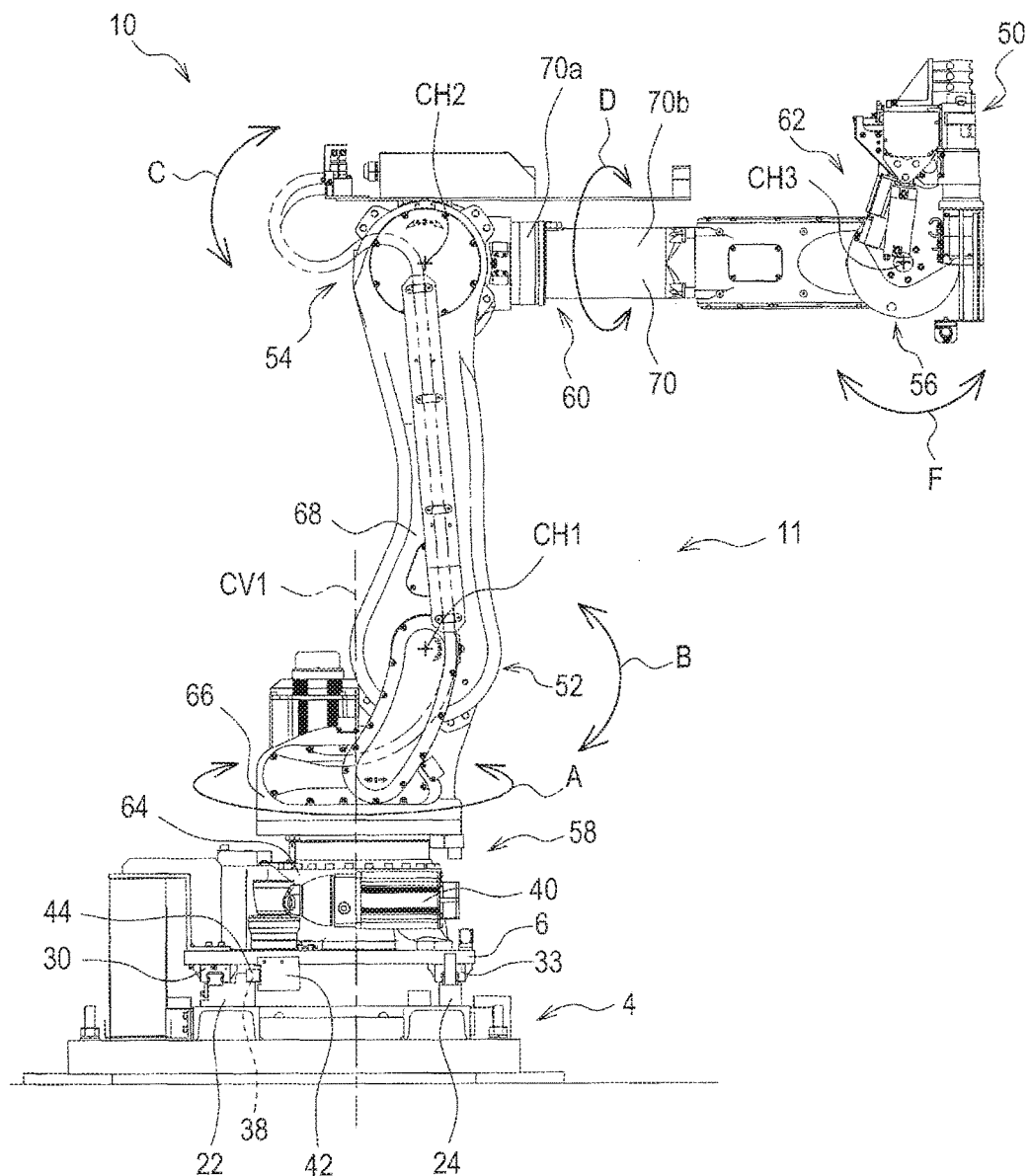
FIG. 6 is an enlarged side view of a first robot device.

As shown in FIG. 6, the first base 6 is disposed on the track device 4 in a direction (that is, the X direction) perpendicular to the paper surface of FIG. 6.

Figure 7:
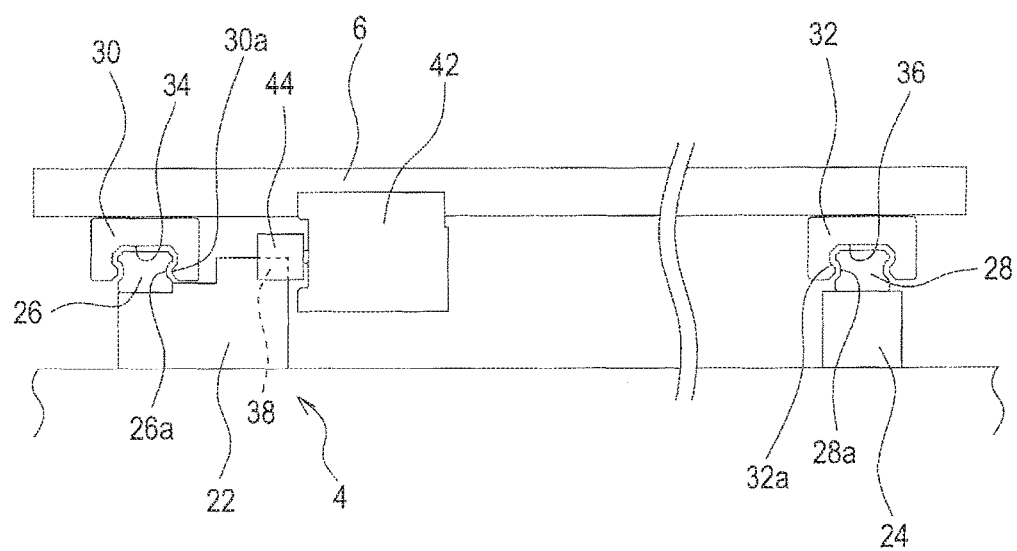
FIG. 7 is an enlarged side view schematically showing a vicinity of a base of the robot device on the track device.

More specifically, as schematically shown in FIG. 7, the track device 4 includes a first base portion 22 projecting upward at the left side of FIG. 7 and a second base portion 24 projecting upward at the right side of FIG. 7. A first rail 26 is disposed on the first base portion 22, and a second rail 28 is disposed on the second base portion 24. The first rail 26 and the second rail 28 are arranged so as to extend parallel to the X direction. The first rail 26 has recesses 26*a* on both right and left sides, and the second rail 28 has recesses 28*a* on both right and left sides.

On the other hand, a first guide 30 and a second guide 32 are arranged on a lower surface of the first base 6 so as to have the same interval as that between the first rail 26 and the second rail 28. The interval is an interval between the center in the width direction of the first rail 26 and the center in the width direction of the second rail 28.

The guides 30 and 32 are, for example, well-known LM guides (registered trademark). A groove 34 mated with the first rail 26 is formed on a lower surface side of the first guide 30. A groove 36 mated with the second rail 28 is formed on a lower surface side of the second guide 32.

On the right and left side surfaces of the groove 34, protrusions 30*a* engaging the recesses 26*a* of the right and left side surfaces of the first rail 26 in the vertical direction of FIG. 7 are formed so as to prevent the first guide 30 from falling off upward in FIG. 7. Similarly, on the right and left side surfaces of the groove 36, protrusions 32*a* engaging the recesses 28*a* of the right and left side surfaces of the second rail 28 in the vertical direction of FIG. 7 are formed so as to prevent the second guide 32 from falling off upward in FIG. 7.

A rack (that is, a rack gear) 38 is formed along the X direction at an upper right end (that is, on the upper surface side) of the first base portion 22.

On the other hand, a motor for base 40 (see FIG. 6) is fixed on the upper surface side of the first base 6, and a gear mechanism 42 to be driven by the motor for base 40 is disposed on the lower surface side. A pinion (that is, a pinion gear) 44 is attached to the tip of the gear mechanism 42, and the rack 38 and the pinion 44 are arranged to mesh with each other.

Accordingly, when the motor for base 40 is driven, the first base 6 (accordingly, the first robot device 11) is moved in the X direction along the track device 4 by the rack 38 and the pinion 44.

<First Robot 10>

Figure 8:
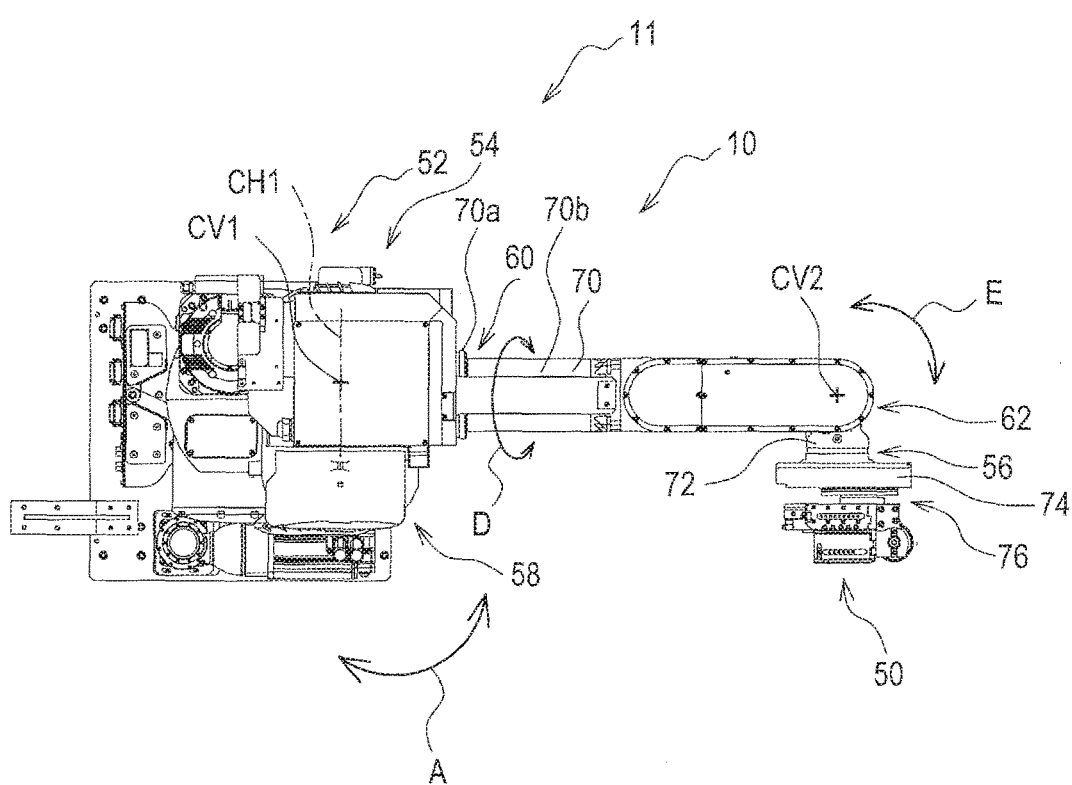
FIG. 8 is an enlarged plan view of the first robot device.

As shown in FIGS. 6 and 8, the first robot 10 is an articulated robot (that is, a multi-articulated robot) including a plurality of arms and a plurality of joints. A bending mechanism 50, to be described later, which grips or bends the longitudinal workpiece 18 such as a pipe is attached to the distal end of the first robot 10.

The first robot 10 includes three first to third swing joints 52, 54, and 56 which allow two members, connected by a joint, to swing, that is, perform a bending motion and three first to third turning joints 58, 60, and 62 which allow one member to perform a rotational motion with respect to the other member connected by a joint. The direction of the axis of the swing joint is at right angles relative to the link direction of the two members, and the direction of the axis of the turning joint is the same as the link direction of the two members.

Specifically, the first robot 10 includes a fixing portion 64 attached to the first base 6, and the fixing portion 64 and a first turning base 66 are connected by a first turning joint 58. The first turning joint 58 has a mechanism that rotationally drives the first turning base 66 at a predetermined angle around a vertical axis CV1. In FIGS. 6 and 8, the rotational direction of the first turning base 66 is indicated by arrow A.

One end of a first arm 68 is connected to the first turning base 66 via the first swing joint 52. The first swing joint 52 has a mechanism that rotationally drives the first arm 68 at a predetermined angle around a horizontal axis CH1. The horizontal axis CH1 of the first swing joint 52 and the vertical axis CV1 of the first turning joint 58 cross at right angles. In FIG. 6, the rotational direction of the first arm 68 is indicated by arrow B.

The other end of the first arm 68 and one end of a second arm 70 are connected via the second swing joint 54. The second swing joint 54 has a mechanism that rotationally drives the second arm 70 at a predetermined angle around an axis CH2 parallel to the horizontal axis CH1 of the first swing joint 52. In FIG. 6, the rotational direction of the second arm 70 is indicated by arrow C.

The second arm 70 is provided with the second turning joint 60, and a rear portion 70*b* of the second arm 70 can perform a twisting motion with respect to a front portion 70*a* with a turning axis at an axial center as the center. In FIGS. 6 and 8, the rotational direction of the rear portion 70*b* is indicated by arrow D.

A second turning base 72 (see FIG. 8) is connected to the other end of the second arm 70 via the third turning joint 62. The third turning joint 62 has a mechanism that rotationally drives the second turning base 72 at a predetermined angle around an axis CV2. The axis CV2 is an axis orthogonal to the horizontal axis CH1 of the first swing joint 52 and the horizontal axis CH2 of the second swing joint 54. In FIG. 8, the rotational direction of the second turning base 72 is indicated by arrow E.

One end of a front arm 74 is connected to the second turning base 72 via the third swing joint 56. The third swing joint 56 rotates the front arm 74 around an axis CH3. In FIG. 6, the rotational direction of the front arm 74 is indicated by arrow F.

It should be noted that the third turning joint 62 and the second turning base 72 shown in FIG. 8 are hidden in FIG. 6 and therefore do not appear. Additionally, rotatable supplemental joint 76 is also known as an axial rotatable joint, and first turning joint 58 is also know as a first vertical turning joint.

As shown in FIG. 8, a rotatable supplemental joint 76 is provided at a front end of the front arm 74, and the bending mechanism 50 is attached to the supplemental joint 76. The supplemental joint 76 is mechanically connected to the third swing joint 56 by a gear mechanism (not shown). The gear mechanism is a well-known gear box configured to increase the rotational speed of the output rather than the rotational speed of the input.

When the third swing joint 56 rotates the front arm 74 by 360°, the supplemental joint 76 rotates the bending mechanism 50 by 360° or more.

According to the above configuration, for example, the bending mechanism 50 can rotate around the workpiece 18 without being interrupted by the workpiece 18.

In the above example, the supplemental joint 76 is mechanically connected to the third swing joint 56 by the gear mechanism (not shown), but the present invention is not limited thereto. The supplemental joint 76 may be configured to be rotated independently of the third swing joint 56 by a separate drive motor, for example.

<Bending Mechanism 50>

Figure 9A:
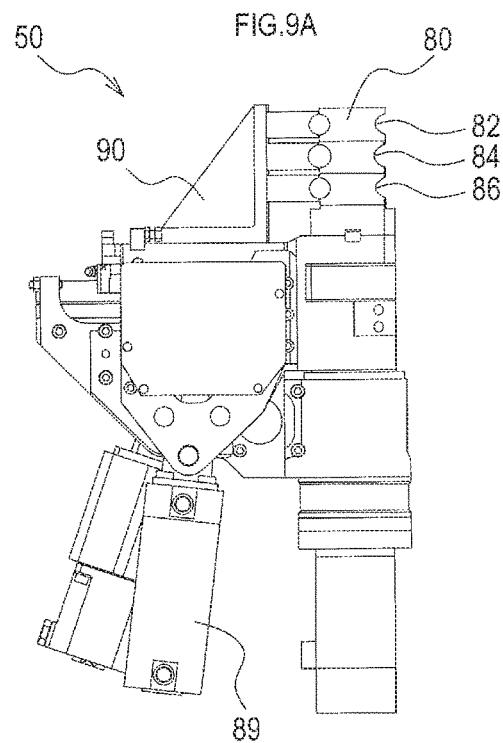
Figure 9B:
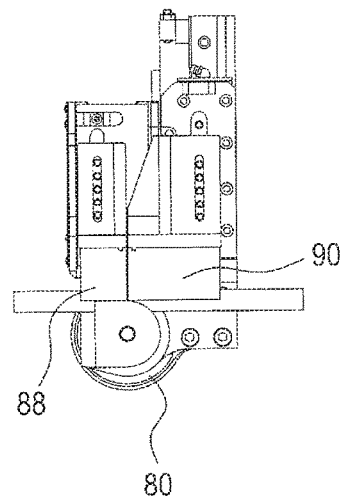

As shown in FIGS. 9A and 9B, the bending mechanism 50 includes a bending die 80. The bending die 80 is formed of three grooves 82, 84, and 86 stacked in an axial direction of the bending die 80 and corresponding to three different bending radii.

In the above example, the bending die 80 is formed of three types of grooves stacked in the axial direction, but the present invention is not limited thereto. The bending dies 80 may be formed of three or more types of grooves, or three or less types of grooves.

In addition, a clamping die 88 which clamps the workpiece 18 in cooperation with the bending die 80 is provided, and the clamping die 88 is driven by a cylinder 89 to move toward the bending die 80. Further, a pressure die 90 which receives a reaction force upon bending is provided in line with the clamping die 88.

Figure 9C:
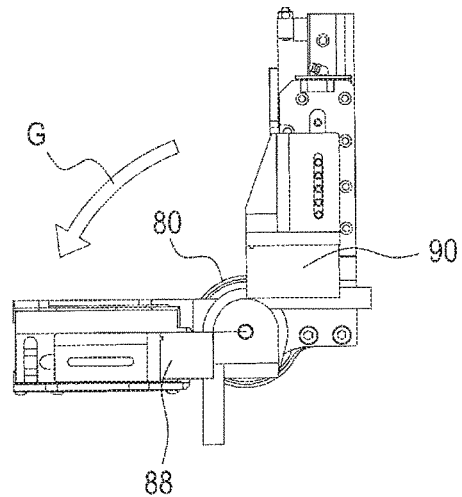

As shown in FIG. 9C, the clamping die 88 revolves around the bending die 80 while clamping the workpiece 18, so that the workpiece 18 can be bent at a predetermined angle. In FIG. 9C, the revolution direction of the clamping die 88 is indicated by arrow G.

<Chuck Device 16>

Figure 10:
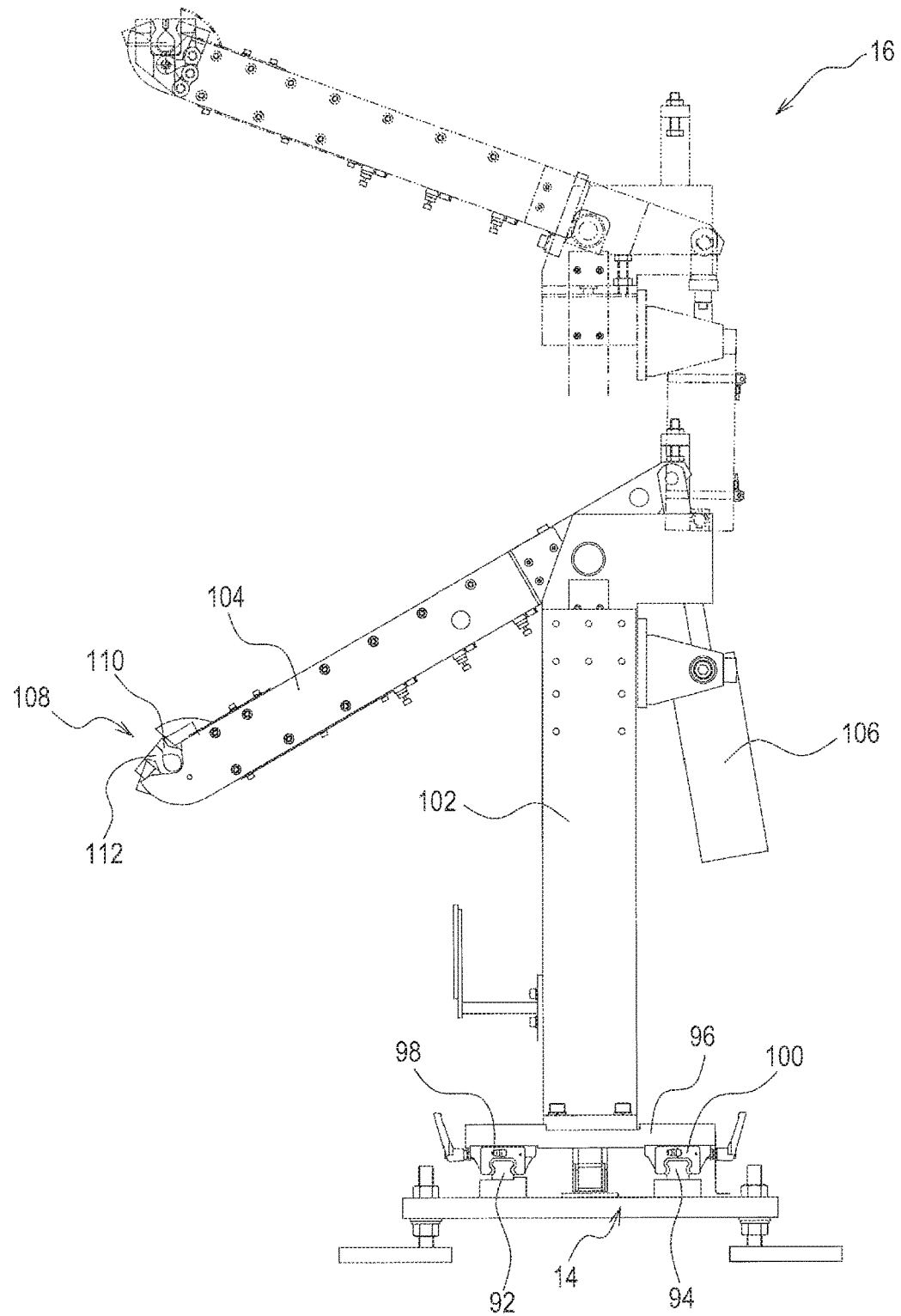
FIG. 10 is a side view showing the chuck device.

As shown in FIG. 10, the chuck device 16 is placed on the auxiliary track device 14 and is manually movable in the paper surface direction (that is, the X direction). The auxiliary track device 14 includes a pair of rails 92 and 94 which are arranged in parallel and are similar to the track device 4.

A substrate 96 is disposed in a lower portion of the chuck device 16, and guides 98 and 100 similar to the first robot device 11 are attached to the lower surface side of the substrate 96.

That is, the guides 98 and 100 are fitted to the rails 92 and 94, and the guides 98 and 98 slide on the rails 92 and 94, whereby the chuck device 16 moves on the auxiliary track device 14.

The chuck device 16 is provided with a support 102 erected on the substrate 96 and an arm 104 protruding from the support 102 on the track device 4 side.

The arm 104 automatically moves vertically by, for example, a pneumatic pressure, a hydraulic pressure, or a drive device (not shown) using a drive motor. The front end side of the arm 104 is automatically swung vertically by a drive device 106.

A chuck mechanism 108 which grips the workpiece 18 so as to hold the workpiece 18 is provided at the front end of the arm 104. The chuck mechanism 108 is constituted of an upper claw portion 110, a lower claw portion 112, a link mechanism (not shown) which opens and closes between the upper claw portion 110 and the lower claw portion 112, and a drive device (not shown) which drives the link mechanism.

In this embodiment, the chuck mechanism 108 is configured such that the workpiece 18 gripped by the chuck mechanism 108 is in a horizontal state, that is, orthogonal to the vertical axis CV1 of the first turning joint 58.

In FIG. 10, the broken line shows a state in which the chuck mechanism 108 is moved upward and the front end side of the arm 104 is lifted upward.

Next, the basic operation of the bending device 2 will be described.

The first and second robot devices 11 and 13 basically can perform similar operations.

<Basic Operation of Each Robot Device 11, 13>

With regard to the first robot device 11, the position of the first robot device 11 in the X direction can be determined by controlling movement of the first base 6 in the X direction. A posture and/or a moving position of the bending mechanism 50 can be controlled by movement in the X direction and turning of the first to third swing joints 52, 54, and 56 and the first to third turning joints 58, 70, and 72.

For example, the bending mechanism 50 can be moved such that the axial direction of the workpiece 18 coincides with the direction of the grooves 82, 84, and 86 of the bending die 80 according to the position where the workpiece 18 is gripped. Further, the bending mechanism 50 can be moved such that the bending direction of the workpiece 18 coincides with the direction of the grooves 82, 84, and 86 of the bending die 80 according to the bending direction of the workpiece 18.

In other words, the posture of the bending mechanism 50 can be changed corresponding to the gripping position and/or the bending direction of the workpiece 18. In the first embodiment, the third swing joint 56 and the supplemental joint 76 are in a certain synchronizing relation. Therefore, if the gripping position and/or the bending direction is defined, the positions of the front arm 74 and the third swing joint 56 are defined.

A position of the second swing joint 54 is on an arc around the first swing joint 52, of which radius is a distance between the first swing joint 52 and the second swing joint 54. The position of the second swing joint 54 is also on an arc around the third swing joint 56, of which radius is a distance between the second swing joint 54 and the third swing joint 56. Accordingly, if the second swing joint 54 is at an intersection between these two arcs, a position of the bending die 80 is defined. There may be a case in which two intersections exist. In that case, one of the intersections is selected which does not cause the second arm 70 to interfere with the workpiece 18, and which does not cause a front end of the workpiece 18 after bent to interfere with the second arm 70.

In this manner, the positions of the respective first to third swing joints 52, 54, and 58 are defined, whereby an angle formed between the fixing portion 64 and the first arm 68, an angle formed between the first arm 68 and the second arm 70, and an angle formed between the second arm 70 and the front arm 74 are respectively calculated. According to the respective angles calculated, the first arm 68, the second arm 70, and the front arm 74 are rotated at predetermined angles by the respective first to third swing joints 52, 54, and 56.

Thereby, the grooves 82, 84, and 86 of the bending die 80 are moved to abut on the workpiece 18.

When the position of the bending mechanism 50 is moved in the X direction, it is possible to cope with such a case by moving the first base 6 in the X direction by a predetermined amount.

<Cooperation of Robot Devices 11, 13>

Figure 11A:
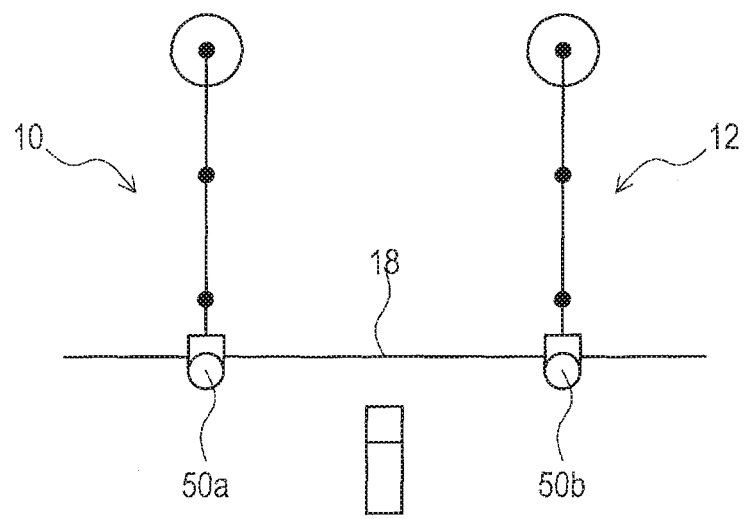

As shown in FIG. 11A, one end side of the workpiece 18 can be gripped by a bending mechanism 50a of the first robot 10, and, at the same time, the other end side of the workpiece 18 can be gripped by a bending mechanism 50b of the second robot 12.

In addition, one end side of the workpiece 18 can be gripped by the bending mechanism 50a of the first robot 10, and, at the same time, the other end side of the workpiece 18 can be bent by the bending mechanism 50b of the second robot 12.

For example, when a brazed portion is present in the middle of the workpiece 18, and/or when a branch pipe is brazed, while the first robot 10 plays the role of a highly flexible chuck device, the second robot 12 moves the bending mechanism 50 to a new position, so that the bending can be performed.

The above-described operation can be performed during bending of the workpiece 18 by the first robot 10. In other words, when one end side of the workpiece 18 is bent by the bending mechanism 50a of the first robot 10, the other end side of the workpiece 18 can be bent by the bending mechanism 50b of the second robot 12.

In addition, while one end side of the workpiece 18 is gripped by the bending mechanism 50a of the first robot 10, the other end side of the workpiece 18 can be gripped again (that is, the gripping position can be changed) by the bending mechanism 50b of the second robot 12.

<Cooperation of Robot Devices 11, 13 and Chuck Device 16>

Figure 11B:
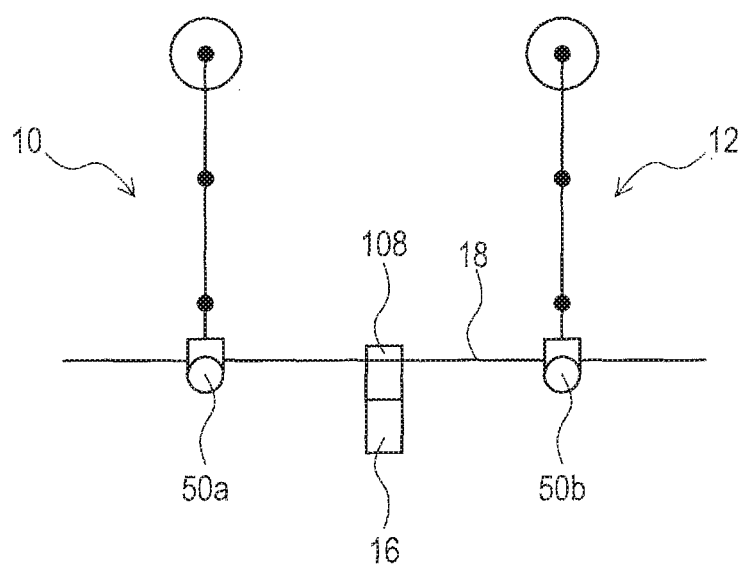

As shown in FIG. 11B, for example, the workpiece 18 disposed on the workpiece feeder 20 is gripped by the bending mechanism 50a of the first robot 10, is moved to the vicinity of the chuck device 16, and can be gripped by the chuck mechanism 108.

In this state, one end side of the workpiece 18 can be bent by the bending mechanism 50a of the first robot 10. Similarly, the other end side of the workpiece 18 can be bent by the bending mechanism 50b of the second robot 12.

When the workpiece 18 is bent at a plurality of positions, the workpiece 18 is prevented from interfering with a known device during bending or the like, and a portion to be gripped may be appropriately changed as necessary to repeat the above-described bending.

For example, the workpiece 18 which has been bent to some extent by the first robot 10 can be bent by the second robot 12 such that the chucking mechanism 108 is released to change its posture so as to avoid interference.

After the bending, for example, the workpiece 18 is gripped by the bending mechanism 50a of the first robot 10, and the chuck mechanism 108 of the chuck device 16 is released, so that the workpiece 18 can be placed on the conveyance receptacle 21.

<Other Operations>

Apart from this, the first robot 10 and the second robot 12 can carry out their own unique operations in parallel.

For example, in the first robot 10, the workpiece 18 disposed on the workpiece feeder 20 is gripped and conveyed, and at the same time, in the second robot 12, another workpiece 18 which has been processed can be conveyed to the conveyance receptacle 21.

Next, an electrical configuration of the bending device 2 will be described.

Figure 12:
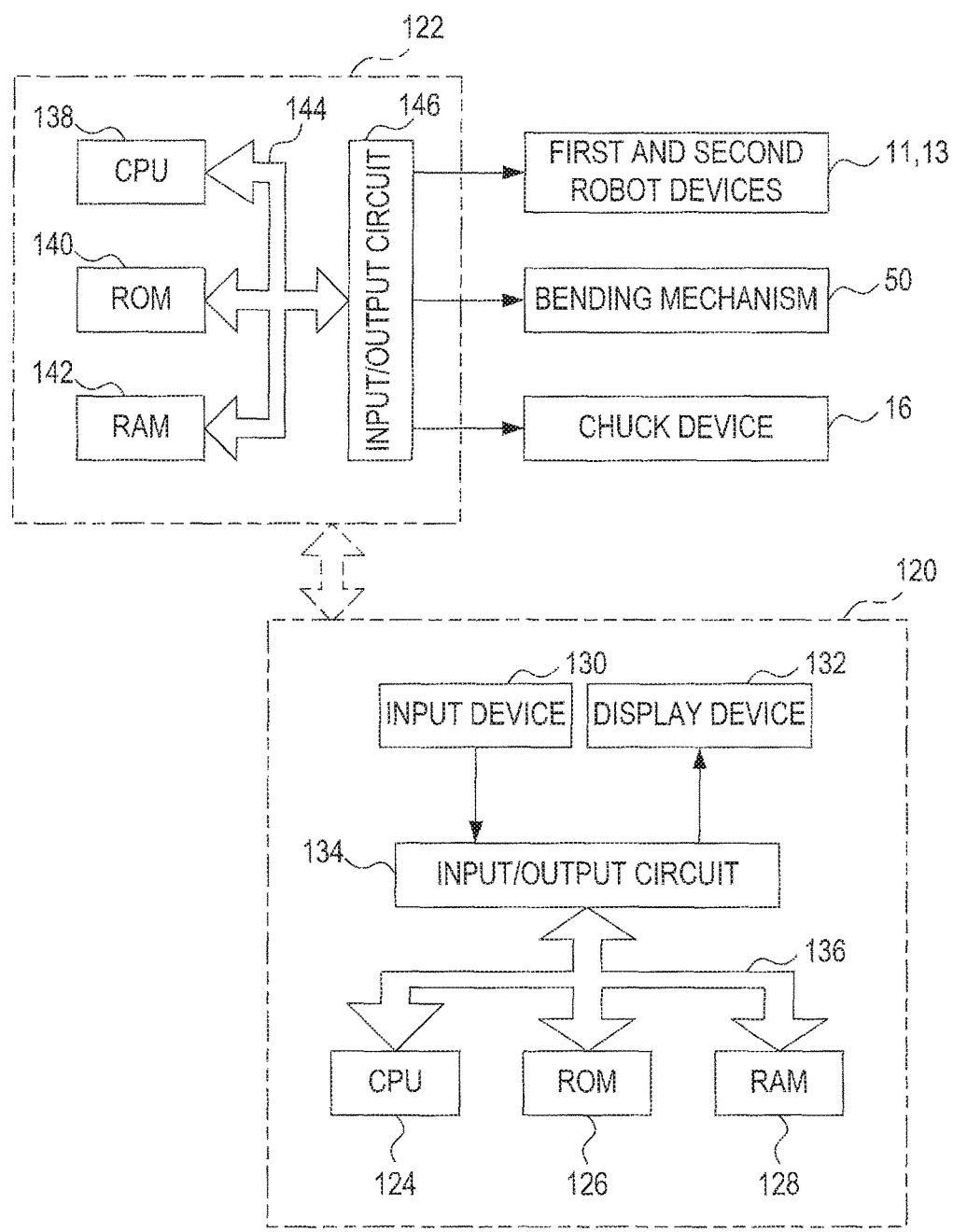
FIG. 12 is a block diagram showing an electrical configuration of the bending device.

As shown in FIG. 12, the bending device 2 is driven and controlled by a touch-panel type host computer 120 and a controller 122 to process the workpiece 18. The touch-panel type host computer 120 includes a CPU 124, a ROM 126, and a RAM 128 as main components of a logic operation circuit. The CPU 124, the ROM 126, and the RAM 128 are connected to an input/output circuit 134 which inputs and outputs signals between an input device 130 and a display device 132 via a common bus 136. The input device 130 may be a well-known keyboard or may be of a touch panel type.

Data relating to machining or a process applied to the workpiece 18 is input to the touch-panel type host computer 120 from the input device 130 operated by an operator. In the touch-panel type host computer 120, a program for operating the first and second robot devices 11 and 13, the bending mechanism 50, and the chuck device 16 is created, and the created program is transmitted from the touch-panel type host computer 120 to the controller 122.

The controller 122 includes a CPU 138, a ROM 140, and a RAM 142 as main components of a logic operation circuit. The CPU 138, the ROM 140, and the RAM 142 are connected to an input/output circuit 146 via a common bus 144, and the first and second robot devices 11 and 13, the bending mechanism 50, and the chuck device 16 are connected to the input/output circuit 146.

Next, a control process of the bending device 2 will be described.

Main operations of the bending device 2 such as a bending control process performed by the controller 122 will be described with reference to the flowcharts of FIGS. 13 and 14.

<Cooperation of Robot Devices 11, 13>

First, the workpiece 18 cut in advance to a predetermined length is conveyed onto the workpiece feeder 20.

Figure 13:
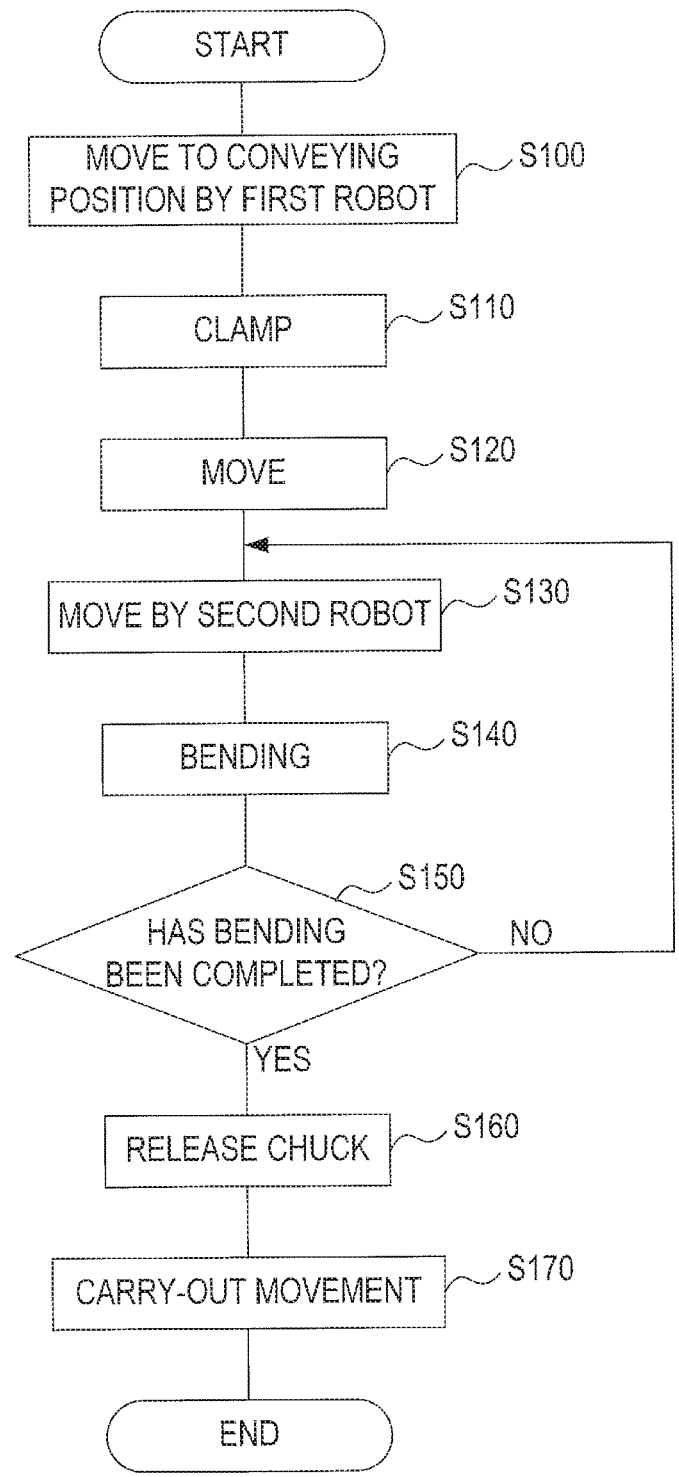
FIG. 13 is a flowchart showing a process in the case of using both robots among processes by a controller of the bending device.

Then, as shown in FIG. 13, the first base 6 and the first turning joint 58 of the first robot 10 are driven such that the first robot 10 faces the workpiece 18 on the workpiece feeder 20. The first to third swing joints 52, 54, and 56 of the first robot 10 are driven to move the bending mechanism 50a, so that the workpiece 18 moves to abut against any one of the grooves 82, 84, and 86 (for example, the groove 82) of the bending die 80 (step 100).

Next, the clamping die 88 is moved, and the workpiece 18 is gripped (that is, clamped) by the bending mechanism 50a (step 110).

After the workpiece 18 is clamped by the bending mechanism 50a, the first robot 10 is controlled to drive the first to third swing joints 52, 54, and 56 and the first to third turning joints 58, 60, and 62, and thus to move the workpiece 18 to a machining position (that is, a bending position) as shown in FIG. 11A, for example (step 120).

Subsequently, the second robot 12 is controlled to move the bending mechanism 50b to the bending position of a workpiece 185 (step 130). If there are a plurality of portions to be bent, the bending is started from the front end side of the workpiece 18. After the bending mechanism 50b is moved to the bending position, the clamping die 88 and the pressure die 90 are driven to abut on the workpiece 18, and the clamping die 88 is revolved around the bending die 80 according to a predetermined bending angle, so that the bending is performed (step 140).

After the bending, the clamping die 88 and the pressure die 90 are released.

If the next bending is to be performed (step 150), the processes in steps 130 and 140 are repeated, and the second robot 12 is controlled to move the bending mechanism 50*b* to the next bending position, and thus to bend the workpiece 18 by the bending mechanism 50*b*.

In this example, although the workpiece 18 is gripped by the first robot 10 and then bent by the second robot 12, the order is not limited. The roles may be mutually exchanged, and the bending may be sequentially performed.

When all processes in the bending have been completed (step 150), the gripping by the bending mechanism 50*b* of the second robot 12 is released while the gripping by the bending mechanism 50*a* of the first robot 10 is continued (step 160).

Thereafter, the first robot device 11 is controlled to move the bending mechanism 50*a*, and thus to move the workpiece 18 onto the conveyance receptacle 21. The gripping of the workpiece 18 by the bending mechanism 50*a* is released to place the workpiece 18 on the conveyance receptacle 21 (step 170).

<Cooperation of Robot Devices 11, 13 and Chuck Device 16>

The contents similar to the process in FIG. 13 will be briefly described.

Figure 14:
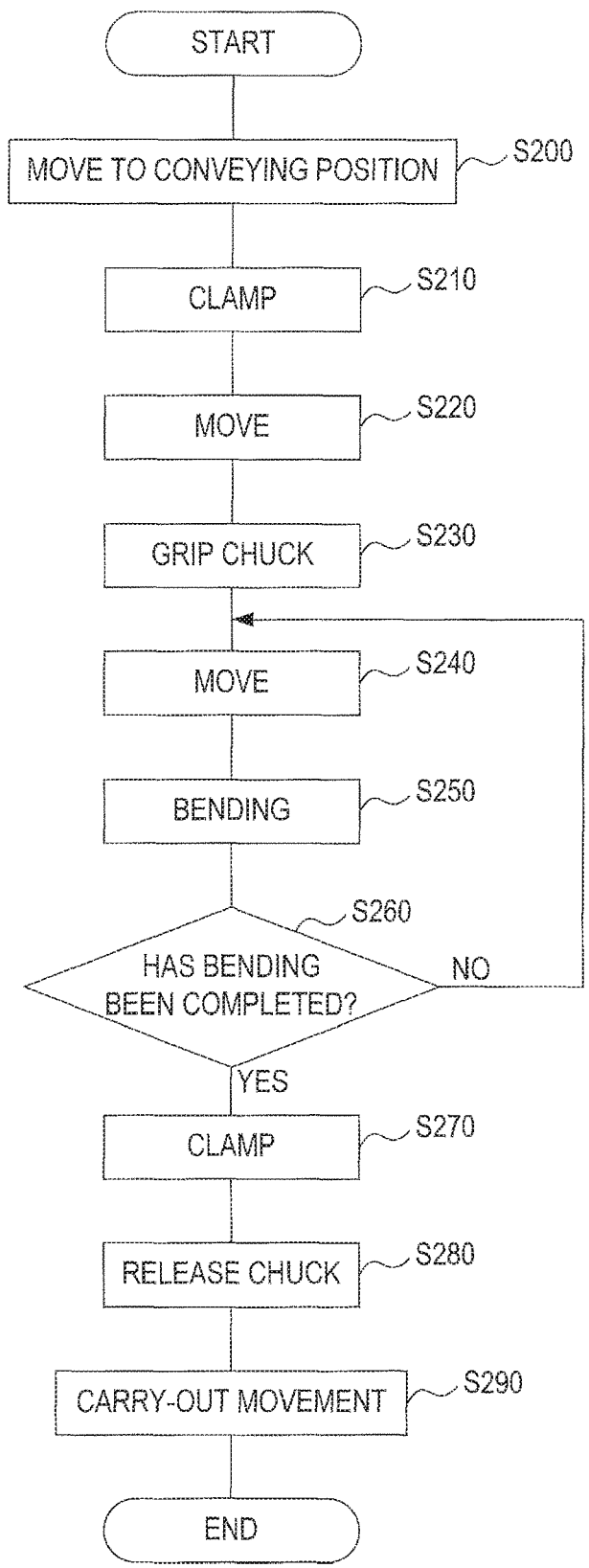
FIG. 14 is a flowchart showing a process in the case of using both robots and the chuck device among the processes by the controller of the bending device.

As shown in FIG. 14, the first base 6 and the first turning joint 58 of the first robot 10 are driven such that the first robot 10 faces the workpiece 18 on the workpiece feeder 20. The first to third swing joints 52, 54, and 56 of the first robot 10 are driven to move the bending mechanism 50*a*, so that the workpiece 18 moves to abut against any one of the grooves 82, 84, and 86 (for example, the groove 82) of the bending die 80 (step 200).

Next, the clamping die 88 is moved, and the workpiece 18 is gripped (that is, clamped) by the bending mechanism 50*a* (step 210).

After the workpiece 18 is gripped by the bending mechanism 50*a*, the first robot 10 is controlled to drive the first to third swing joints 52, 54, and 56 and the first to third turning joints 58, 60, and 62, and thus to move the workpiece 18 to a chuck position according to the chuck device 16, as shown in FIG. 11B, for example (step 220).

In the chuck device 16, the chuck mechanism 108 is driven to grip the workpiece 18 (step 230).

Subsequently, for example, the second robot 12 is controlled to move the bending mechanism 50*b* to the bending position of the workpiece 185 (step 240).

If there are a plurality of portions to be bent, the bending is started from the front end side of the workpiece 18. After the bending mechanism 50*b* is moved to the bending position, the clamping die 88 and the pressure die 90 are driven to abut on the workpiece 18, and the clamping die 88 is revolved around the bending die 80 according to a predetermined bending angle, so that the bending is performed (step 250).

After the bending, the clamping die 88 and the pressure die 90 are released.

If the next bending is to be performed (step 260), the processes in steps 240 and 250 are repeated, and the second robot 12 is controlled to move the bending mechanism 50*b* to the next bending position, and thus to bend the workpiece 18 by the bending mechanism 50*b*.

In this example, although the workpiece 18 is bent by the second robot 12, the workpiece 18 may be bent by the first robot 10 or may be bent simultaneously by both the robots 10 and 12.

When all processes in the bending have been completed (step 260), the workpiece 18 is gripped by the bending mechanism 50*a* of the first robot 10 (step 270), and the gripping by the chuck mechanism 108 is released (step 280).

Then, the first robot device 11 is controlled to move the bending mechanism 50*a*, and thus to move the workpiece 18 onto the conveyance receptacle 21. The gripping of the workpiece 18 by the bending mechanism 50*a* is released to place the workpiece 18 on the conveyance receptacle 21 (step 290).

In this example, although the workpiece 18 is conveyed to the conveyance receptacle 21 by the first robot device 11, the workpiece 18 may be conveyed to the conveyance receptacle 21 by the second robot device 13.

Next, another example of the cooperation of the robot devices 11 and 13 and the chuck device 16 will be described.

Figure 15:
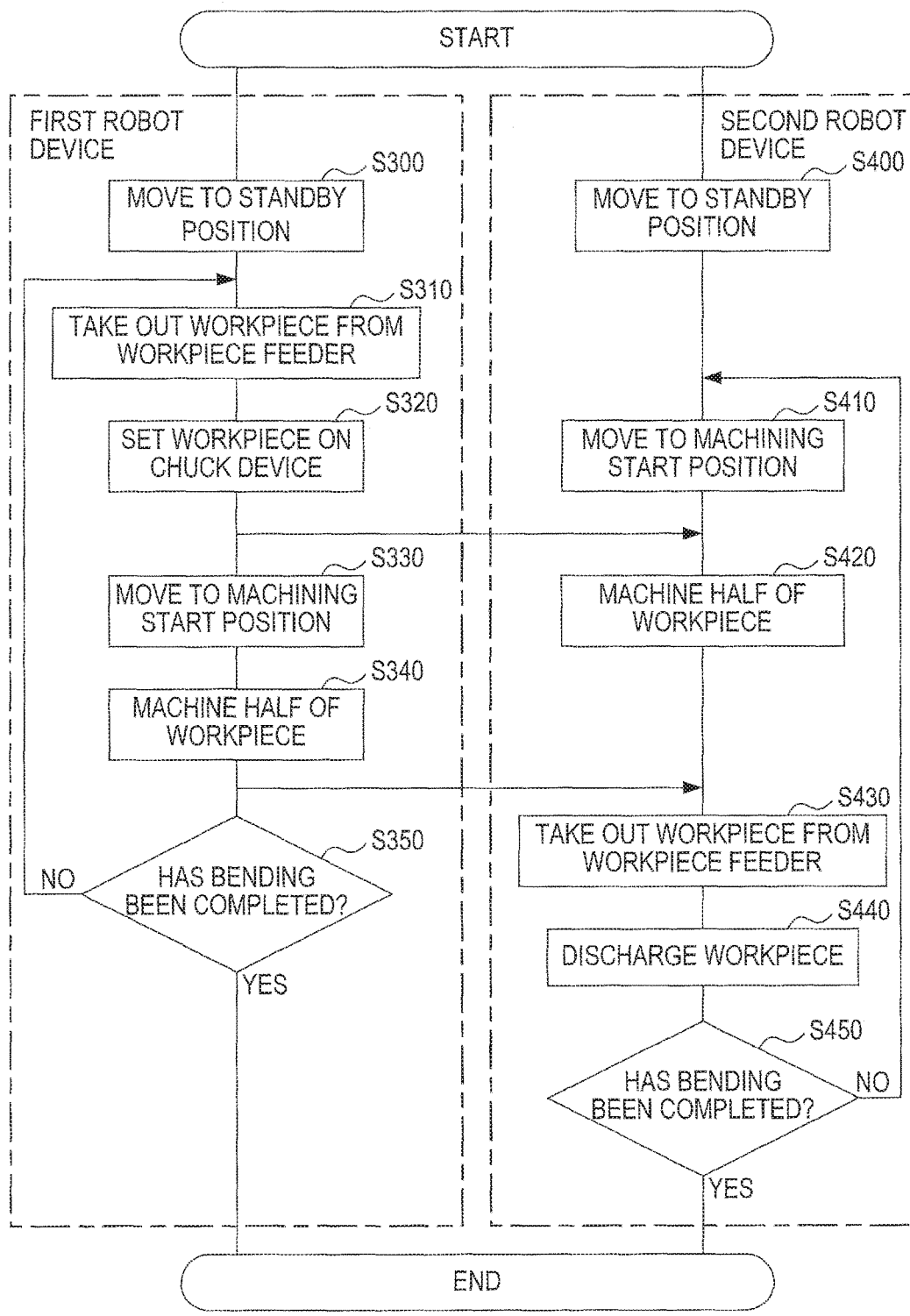
FIG. 15 is a flowchart showing another process in the case of using both robots and the chuck device.

As shown in FIG. 15, when the bending is started (that is, when production is started), after the first robot device 11 moves to a standby position (step 300), the workpiece 18 is taken out from the workpiece feeder 20 (step 310) and gripped (or set) by the chuck device 16 (step 320).

Then, the first robot device 11 moves to a machining start position (step 330), and a half of the workpiece 18 (that is, one end side) is machined (step 340).

Then, it is determined whether the bending has been completed (that is, the production has been completed) (step 350). When the bending is not completed, the process returns to step 310, and when the bending has been completed, this process is terminated.

On the other hand, after the second robot device 13 moves to the standby position (step 400), similarly to the first robot device 11, the second robot device 13 moves to the machining start position (step 410).

Then, after the workpiece 18 is set on the chuck device 16 by the first robot device 11, the other half of the workpiece (that is, the other end side) is machined (step 420).

After the half of the workpiece 18 is machined by the first robot device 11, the workpiece 18 is taken out from the chuck device 16 (step 430) and discharged to the conveyance receptacle 21 (step 440).

Then, it is determined whether the bending has been completed (that is, the production has been completed) (step 450). When the bending is not completed, the process returns to step 410, and when the bending has been completed, this process is terminated.

Next, an effect obtained by the bending device 2 will be described.

In the first embodiment, since the first robot 10 placed on the first base 6 and the first robot 12 placed on the second base 8 are the multi-articulated robots each having the above-described joints, the bending mechanism 50 can be disposed at a desired position by moving the first base 6 and/or the second base 8 along the track device 4 and, at the same time, bending the joint of the multi-articulated robot in a desired direction. Thus, the workpiece 18 gripped by the bending mechanism 50 can be disposed at a desired position.

That is, when the workpiece 18 is conveyed and/or bent, the workpiece 18 can be easily moved to a position where the workpiece 18 does not interfere with the surrounding devices and/or a position suitable for conveyance (for example, a position where the conveying time is short).

Accordingly, since, for example, one end side and/or the other end side of the workpiece 18 can be bent at the above-described preferable position, it is possible to achieve a remarkable effect that the degree of freedom of machining is high and the machining time can be shortened.

The first base 6 and the second base 8 can move, and, at the same time, the first robot 10 and the second robot 12 can be operated simultaneously. Therefore, in the course of conveying the workpiece 18, for example, the workpiece 18 can be bent while being gripped by the first robot 10, and, at the same time, another workpiece 18 can be bent while being gripped by the second robot 12. In other words, in both the first robot 10 and the second robot 12, the workpieces 18 can be respectively bent while being conveyed, and therefore, there is an effect that the machining time can be greatly shortened.

In addition, since the first robot device 11 and the second robot device 13 can be controlled to independently operate, different operations can be performed simultaneously by the first robot device 11 and the second robot device 13.

Moreover, when a brazed portion is present in the middle of the workpiece 18, and/or when a branch pipe is brazed, while the first robot 10 plays the role of a highly flexible chuck device, the second robot 12 moves the bending mechanism 50 to a new position, so that the bending can be performed.

In the first embodiment, the chuck device 16 having the chuck mechanism 108 which grips the workpiece 18 is provided separately from the track device 4. Thus, the workpiece 18 conveyed by the first robot 10 and/or the second robot 12 is gripped by the chuck device 16, and the workpiece 18 can be bent in this state by using the bending mechanism 50 of the first robot 10 and/or the second robot 12. Therefore, there is an effect that the degree of freedom of machining is further improved. The workpiece conveyed by the first robot 10 and/or the second robot 12 may be one before bending or one after bending.

Since the chuck device 16 is movable on the auxiliary track device 14, the degree of freedom of the position where the workpiece 18 is chucked is high, so that there is an effect that the degree of freedom of machining is further improved.

In the chuck device 16, the vertical position can be automatically changed, and, in addition, the chuck mechanism 108 is provided at the front end of the arm 104. Therefore, there is an advantage that the degree of freedom of the gripping position is improved.

Moreover, there is the effect that the workpiece 18 which has been bent to some extent by the first robot 10 can be bent by the second robot 12 such that the chucking mechanism 108 is released to change its posture so as to avoid interference.

[Embodiment 2]

Next, a bending device of the second embodiment will be described, and the description of the same content as that in the first embodiment will not be repeated.

Figure 16A:
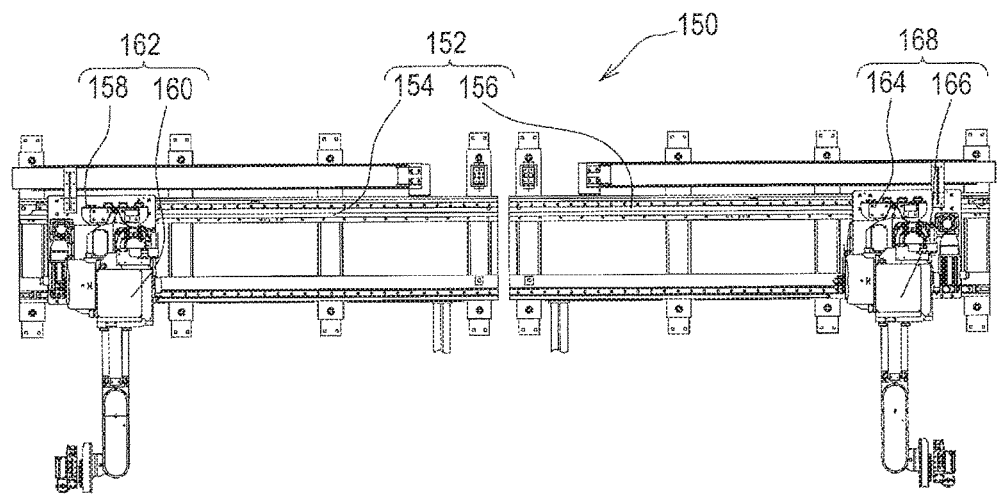
FIG. 16A is a plan view showing a bending device of a second embodiment.

As shown in FIG. 16A, in a bending device 150 of the second embodiment, a track device 152 is separated into a first track device 154 and a second track device 156 provided on the right and left sides. The first track device 154 and the second track device 156 are arranged on a straight line.

A first robot device 162 including a first base 158 and a first robot 160 is disposed on the first track device 154 as in the first embodiment, and a second robot device 168 including a second base 164 and a second robot 166 is similarly disposed on the second track device 156.

In the second embodiment, the same effect as in the first embodiment is obtained.

[Embodiment 3]

Next, a bending device of the third embodiment will be described, and the description of the same content as that in the first embodiment will not be repeated.

Figure 16B:
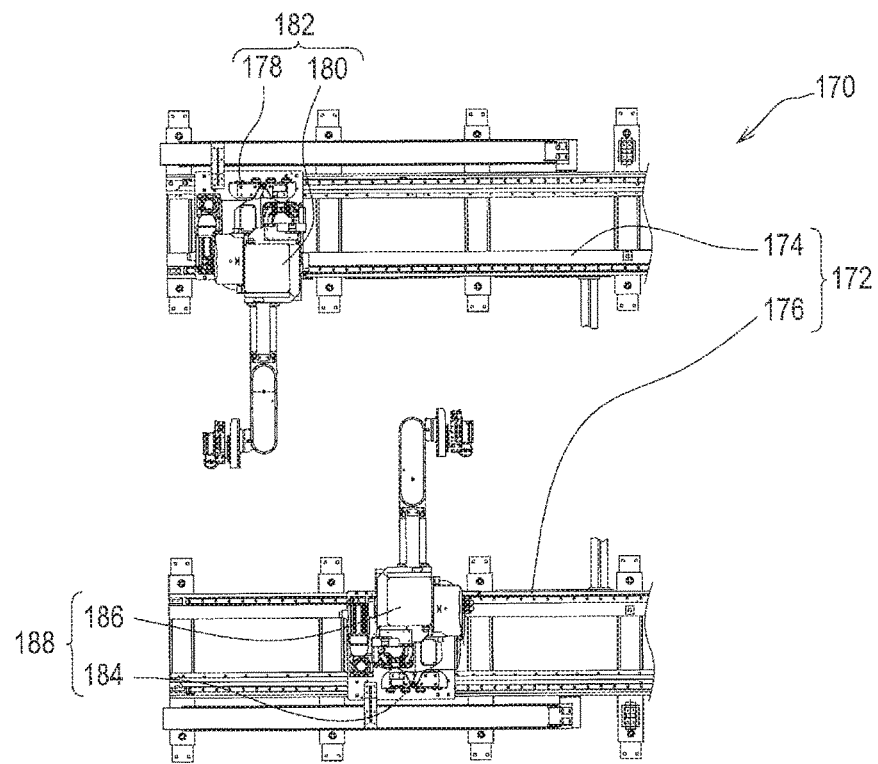
FIG. 16B is a plan view showing a bending device of a third embodiment.

As shown in FIG. 16B, in a bending device 170 of the third embodiment, a track device 172 is constituted of a first track device 174 and a second track device 176 arranged side by side (in parallel).

A first robot device 182 including a first base 178 and a first robot 180 is disposed on the first track device 174 as in the first embodiment, and a second robot device 188 including a second base 184 and a second robot 186 is similarly disposed on the second track device 176.

In the third embodiment, the same effect as in the first embodiment is obtained.

The present disclosure is not limited to the foregoing embodiments, but may have various modes as far as the modes are in the technical scope of the present disclosure.

For example, the functions of one constituent element in each embodiment may be shared by a plurality of constituent elements, or the functions of a plurality of constituent elements may be exerted by one constituent element. Further, some configurations of each embodiment may be omitted. Furthermore, at least some configurations of each embodiment may be added to, replaced with or the like the configurations of the other embodiments described above. In addition, all aspects that are included in the technical spirit that is specified in the attached claims are embodiments of the present disclosure.

The invention claimed is:

1. A bending device for bending a first workpiece, the bending device comprising:
   a main track device arranged in a longitudinal direction;
   a first base configured to move longitudinally on the main track device;
   a second base configured to move longitudinally on the main track device;
   a first robot mounted on the first base, wherein the first robot is multi-articulated and includes a first rotatable supplemental joint;
   a second robot mounted on the second base, wherein the second robot is multi-articulated and includes a second rotatable supplemental joint;
   a first bending mechanism mounted on a distal end of the first robot;
   a second bending mechanism mounted on a distal end of the second robot;
   an auxiliary track device arranged parallel with the main track device and offset transversely from the main track device; and
   a chuck device mounted on the auxiliary track device and configured to move longitudinally on the auxiliary track device, wherein the chuck device includes:
   a chuck substrate mounted on the auxiliary track device;
   a chuck support mounted on the chuck substrate;
   a chuck arm located on a chuck pivot and mounted on the chuck support; and
   a chuck mechanism located on a distal end of the chuck arm and configured for gripping;
   wherein the chuck device is located within a first range of the first robot and within a second range of the second robot; and
   wherein the chuck pivot is located vertically above the auxiliary track device and rotates about a horizontal axis parallel with the auxiliary track device.

2. The bending device of claim 1, further comprising a controller including instructions stored in a non-transitory storage medium that, when executed by at least one processor, cause the bending device to perform the following steps:
   moving, by the first robot, to a conveying position;
   clamping, by the first robot, the first workpiece;
   moving, by the first robot, the first workpiece to the chuck device;

gripping, by the chuck device, the first workpiece;
moving, by the second robot, towards the first workpiece located at the chuck device;
bending, by the second robot, the first workpiece;
determining that all bending is completed;
gripping, by the first robot, the first workpiece;
releasing, by the chuck device, the first workpiece; and
carrying, by the first robot and/or by the second robot, the first workpiece away from the chuck device.

3. The bending device of claim 1, further comprising a workpiece feeder located on a side of the main track device that is opposite to the chuck device.

4. The bending device of claim 3, further comprising a controller including instructions stored in a non-transitory storage medium that, when executed by at least one processor, cause the bending device to perform the following steps:
    taking out, by the first robot, the first workpiece from the workpiece feeder;
    setting, by the first robot, the first workpiece on the chuck device;
    moving, by the first robot, to a first machining start position;
    bending, by the first robot, a first portion of the first workpiece; and
    determining that bending has been completed.

5. The bending device of claim 3, further comprising a controller including instructions stored in a non-transitory storage medium that, when executed by at least one processor, cause the bending device to perform the following steps:
    taking out, by the first robot, the first workpiece from the workpiece feeder;
    setting, by the first robot, the first workpiece on the chuck device, and substantially simultaneously moving the second robot to a second robot machining start position;
    moving, by the first robot, to a first robot machining start position, and substantially simultaneously bending, by the second robot, a portion of the first workpiece;
    bending, by the first robot, an additional portion of the first workpiece, whereby the first workpiece with bent portions comprises a bent first workpiece;
    taking, by the second robot, the bent first workpiece from the chuck device; and
    discharging, by the second robot, the bent first workpiece.

* * * * *